United States Patent [19]

Lindenfors et al.

[11] 3,926,951

[45] Nov. 16, 1975

[54] NONIONIC CELLULOSE ETHERS

[75] Inventors: Sven Georg Lindenfors; Sven-Olof Johan Westberg, both of Domsjoverken, Sweden

[73] Assignee: MoDoKemi AB, Stenungsund, Sweden

[22] Filed: Mar. 11, 1974

[21] Appl. No.: 450,132

[30] Foreign Application Priority Data

Mar. 14, 1973 Sweden .............................. 7303582

[52] U.S. Cl. ......................... 260/231 A; 106/197 R
[51] Int. Cl.$^2$ ....................................... C08B 11/193
[58] Field of Search .................... 260/231 R, 231 A; 106/197 R

[56] References Cited
UNITED STATES PATENTS

| | | | |
|---|---|---|---|
| 2,839,419 | 6/1958 | Windover et al. ............... | 106/197 R |
| 2,965,508 | 12/1960 | Windover et al. ............... | 106/197 R |
| 3,296,247 | 1/1967 | Klug ................................ | 260/231 A |
| 3,493,407 | 2/1970 | Greminger et al. .............. | 106/197 R |
| 3,749,710 | 7/1973 | Koyanagi et al. ................ | 260/231 A |
| 3,873,518 | 3/1975 | Strange et al. ................... | 260/231 A |

FOREIGN PATENTS OR APPLICATIONS

| | | | |
|---|---|---|---|
| 226,268 | 4/1969 | Sweden ............................ | 260/231 A |
| 331,903 | 1/1971 | Sweden ............................ | 260/231 A |

*Primary Examiner*—Ronald W. Griffin

[57] ABSTRACT

Nonionic cellulose ethers are provided having hydroxyethyl groups and hydroxypropyl and/or hydroxybutyl groups and also alkyl groups having two to four carbon atoms which form aqueous solutions and which have a high hydrophilic character.

14 Claims, No Drawings

NONIONIC CELLULOSE ETHERS

Cellulose derivatives, such as hydroxyethyl cellulose (HEC), hydroxypropyl cellulose (HPC), methyl hydroxyethyl cellulose (MHEC), ethyl hydroxyethyl cellulose (EHEC), and methyl hydroxypropyl cellulose (MHPC) are generally used, e.g. as bonding agents, thickening agents, and film-forming agents in a great number of applications. By a suitable choice of the substituents and variation of their molecular substitution (MS) or degree of substitution (DS), the characteristics of the cellulose ethers can be adapted to the intended field of use. Generally, cellulose derivatives are desired, which have a high clarity and a low gel content as well as variable flocculating temperature and viscosity, which are easily adaptable to the final application.

The morphological structure of cellulose is primarily responsible for the formation of so-called fiber and gel constituents in aqueous solutions of cellulose ethers. Even if fiber portions visible to the naked eye are removed, the properties of cellulose ethers are influenced by invisible constituents which results in considerable technological disadvantages. It is well known that the use of ethylene oxide to introduce substituents into cellulose even at a relatively low MS substantially facilitates the introduction of other substituents in the cellulose molecule by increasing the spacing between the cellulose molecules, in particular within the well-ordered regions of the cellulose fibers, and by increasing the number of primary hydroxyl groups per anhydroglucose unit, which generally results in enhancing the reactivity of the cellulose. Due to the increased availability and reactivity, the substitution will be more uniform in each fiber and along each cellulose molecule, whereby solvation is facilitated and the fiber and gel constituents are minimized. When ethylene oxide alone is used to introduce substituents into cellulose, disadvantages arise with respect to both production and use because the hydroxyethyl cellulose (HEC) is so hydrophilic that its flocculating temperature is above 100°C. Therefore, it cannot be purified by means of hot water, but organic liquids must be used, which results in sanitary drawbacks, high process costs, and a higher ash content in the final product. Because the hyrophilic-lipophilic balance (HLB) in such a cellulose ether is always high, the molecule is not suitable for systems which require a low HLB value.

The next higher homologue to ethylene oxide, i.e. propylene oxide, does not have the same reaction-promoting activity at a low molecular substitution (MS). At a high MS high grade products can be obtained, but due to the hydrophobic character imparted to the cellulose ether by the hydroxypropyl substituent, the flocculating temperatures will be so low that the industrial use of the product in aqueous solution is restricted.

A third type of nonionic cellulose ether is the alkyl cellulose ethers, e.g. methyl cellulose and ethyl cellulose. Because of the hydrophobic character of the methyl and ethyl substituents, the flocculating temperature within the water-soluble range will be below about 55°C, which limits the usefulness of these ethers. To broaden the fields of application of these cellulose ethers, alkyl substituents have been combined with hydroxyalkyl groups, as in MHEC, EHEC and MHPC referred to above. Due to the hydrophobic character of the alkyl groups and the hydrophilic or weakly hydrophobic character of the hydroxyalkyl groups, the alkyl substitution will dominate if the requirement that the product shall be capable of being washed with hot water is maintained, so that the cellulose ether possesses a relatively hydrophobic character.

In accordance with the invention, nonionic cellulose ethers are provided having hydroxyethyl groups and hydroxypropyl groups and/or hydroxybutyl groups as well as alkyl groups having from about two to about four carbon atoms. Such ethers dissolve in water to produce good aqueous solutions, and are essentially more hydrophilic than previously known alkyl hydroxyalkyl cellulose ethers of substantially the same flocculating temperature. The characteristics of these cellulose ethers can be controlled simply by varying their molecular substitution (MS) with respect to hydroxyalkyl groups and/or their degree of substitution (DS) with respect to alkyl groups. These cellulose ethers are also soluble in organic solvents. The cellulose ethers of this invention preferably have a hydroxyethyl MS of from about 0.1 to about 2.5, preferably from about 0.2 to about 1, a total hydroxypropyl and/or hydroxybutyl MS of from about 0.1 to about 4, preferably from about 0.5 to about 2.5, and an alkyl DS of from about 0.05 to about 1.5 preferably from about 0.1 to about 1. The substitution of the cellulose ethers, which is difficult to analyze, has been determined by a combination of the analysis methods described by Morgan, Industrial Engineering Chemistry, Anal. Ed. 18 500 (1956); Lemineux and Purves, Canadian J.R. B-25 485 (1947); and W. Merz, Zeit fur Analyt. Chemie 232 82 (1967:2). In these methods, the ether groups are split off by hydriodic acid, while terminal methyl groups are oxidized with chromic oxides, after which the reaction products are analyzed quantitatively by titration and vapor phase chromatograph.

The ethylene oxide is added to the cellulose to increase the accessibility of the cellulose molecule for reaction and to impart to it a desired hydrophilic character. It has been estimated that when the MS is above about 0.4, the number of polyethylene oxide chains comprising more than three ethylene oxide units increases very markedly with increasing MS. Such chains which are very hydrophilic also comprise a primary hydroxyl group. In the presence of propylene oxide and/or butylene oxide, which react substantially with primary hydroxyl goups and which have substantially less tendency to form chains than ethylene oxide, block-like substituents are formed along the cellulose molecule. Since the hydroxypropyl and hydroxybutyl groups are less hydrophobic than alkyl groups having two to four carbon atoms, the molecular substitution, and thereby the direct substitution on the hydroxyl groups of the anhydroglucose unit, can be high without resulting in impractically low values for the flocculating temperature. The increased substitution and the uniform distribution of the substituents along the cellulose chain result in increased resistance to degradation caused by microorganisms.

The combined use of ethylene oxide and a higher alkylene oxide provide a route for introduction of hydroxyethyl and higher alkyl groups which is more reliable and simpler than the combination of ethylene oxide and methyl choride (very volatile, boiling point −24°C) or the combination of ethylene oxide and ethyl chloride (high reaction temperature). The present invention also provides a process which makes possible the introduction of alkyl groups at a considerably lower temperature than previously.

It has also been found that the best product properties are obtained by charging as much as possible of the higher alkylene oxide, i.e. propylene oxide and/or butylene oxide, in one addition. In this respect, it is an essential practical advantage that propylene oxide and butylene oxide react less strongly exothermically than ethylene oxide.

As already mentioned, it was surprisingly found that the cellulose ethers of this invention are substantially more hydrophilic than conventional alkyl hydroxyalkyl cellulose ethers of similar flocculating temperatures. The cause of this phenomenon cannot be explained. According to the invention, the flocculating temperature and hydrophilic character can be controlled to desired values by suitable modification of the introduction of hydroxypropyl and/or hydroxybutyl groups which has not been possible hitherto.

The high hydrophilic character relative to the flocculating temperature of the cellulose ethers according to the invention is illustrated by the following experiment in which aqueous suspensions or solutions of various cellulose ethers at high temperature were centrifuged to separate suspended solids. The solids content of the cellulose ether suspension or solution after centrifuging is a measure of the cellulose ethers' tendency to retain water. A low solids content indicates a cellulose ether of high hydrophilic character.

TABLE I

| Cellulose Ether | Flocculating Temp., °C | Solids % by Weight |
|---|---|---|
| Ethyl hydroxyethyl cellulose (EHEC) $DS_{ethyl} = 0.9$ $MS_{hydroxyethyl} = 0.8$ | 70 | 41 |
| Ethyl hydroxyethyl hydroxypropyl cellulose (EHEHPC) $DS_{ethyl} = 0.15$ $MS_{hydroxyethyl} = 0.7$ $MS_{hydroxypropyl} = 2.0$ | 67.5 | 25 |
| Ethyl hydroxyethyl hydroxypropyl cellulose (EHEHPC) $DS_{ethyl} = 0.25$ $MS_{hydroxyethyl} = 0.7$ $MS_{hydroxypropyl} = 2.0$ | 63 | 34 |

The experiment shows that the two cellulose ethers of this invention (EHEHPC), in spite of considerably lower flocculating temperatures, have a higher hydrophilic character than the conventional ethyl hydroxyethyl cellulose.

The unexpectedly pronounced hydrophilicity also manifests itself in a reduced sensitivity to electrolytes as compared to conventional alkyl hydroxyalkyl cellulose ethers having the same or even higher flocculating temperatures. This is seen from Table II below, where EHEC and EHEHPC are the same cellulose ethers as those given in Table I of identical flocculating temperature. The numbers indicate the highest amount of salt in grams per 100 ml solution that can be added before the cellulose ether is salted out.

TABLE II

| Salt | EHEC Flocculating Temp. 70°C | EHEHPC Flocculating Temp. 63°C |
|---|---|---|
| AlCl$_3$ | 41 | saturation |
| Na$_2$SO$_4$ | 2.5 | 6 |
| NaCl | 8 | 17 |

TABLE II-continued

| Salt | EHEC Flocculating Temp. 70°C | EHEHPC Flocculating Temp. 63°C |
|---|---|---|
| Sodium tartrate | 4.5 | 11 |
| Sodium citrate | 4 | 7.5 |

The hydrophilic character is a positive property which may be made use of in many applications.

In addition to the advantages above, the cellulose ethers of this invention have a surprisingly high viscosity. It has been established, contrary to what might have been expected, that an increase in viscosity is obtained by the alkylation of the hydroxy groups of the cellulose ether. It is known that many nonionic cellulose ethers pass through a viscosity maximum in aqueous solution as substitution increases. On further increased substitution, the cellulose ethers more closely approach a true solution, and the gel state, which contributed to the viscosity increase, is reduced. With a suitable charge of ethylene oxide and a higher alkylene oxide, it is possible to obtain a product which has passed the gel maximum and which is of very high quality. Alkylation results in an increase in hydrophobicity, and a consequent lowering of the flocculating temperature, and also in a viscosity increase while the cellulose ether retains the excellent solubility properties.

In the modified Staudinger equation,
$$[\eta] = KM^a$$
where:

[$\eta$] is the intrinisc viscosity,

K is an empirical constant, and

M is the molecular weight.

It is known that the coefficient $a$ of the modified Staudinger equation represents a measure of the stretching out of the molecule in solution, such stretching out being less the more hydrophobic the cellulose ether is. Therefore, it is surprising that the viscosity increases when in accordance with this invention a strongly hydrophobic group is introduced into a molecule which is very close to a state of genuine solution. Why the expected reduction in viscosity is not obtained in this particular case cannot be explained. Nonetheless, the observed viscosity increase is of great importance, since normally it is not difficult to produce cellulose derivatives of sufficiently low viscosity, while it is not always possible to obtain a sufficiently high viscosity.

It is also known that the flocculating temperature of cellulose ethers depends not only on the type of substituent and the degree of substitution, but also on the molecular weight. For viscosities below about 100 cp (2% aqueous solution, Brookfield Viscosimeter), the flocculating temperature increases more or less rapidly, which may be seen from Table III which follows.

TABLE III

| | Flocculating Temperature, °C | |
|---|---|---|
| Viscosity cp | EHEC $DS_{ethyl} = 0.9$ $MS_{hydroxyethyl} = 0.6$ | EHEHPC $DS_{ethyl} = 0.25$ $MS_{hydroxyethyl} = 0.7$ $MS_{hydroxypropyl} = 2.0$ |
| 10,000 | — | 63° |
| 100 | 65.5° | 63.5° |
| 10 | 78° | 69.5° |

The increase in flocculating temperature with lowered viscosity is an important disadvantage from many aspects, inter alia, when low-viscosity products are to be washed with hot water. As seen from Table III, the flocculating temperature of the products of the invention surprisingly is generally independent of viscosity between 10 and 10,000 cp.

The nonionic cellulose ethers of this invention are prepared by reacting cellulose, mercerized with alkali hydroxide, with ethylene oxide, propylene and/or butylene oxide, and at least one alkyl halide having from 2 to 4 carbon atoms in presence of an organic reaction medium, the resulting cellulose ether, if desired, being subsequently washed and any remaining alkali hydroxide neutralized, whereupon the cellulose ether is dried to a solids content of above 90% by weight. The reaction medium may be an inert organic solvent, such as xylene, acetone, pentane, hexanol, or dichloromethane, but generally it is preferred to use an alkyl halide, such as ethyl chloride, propyl chloride, butyl chloride, ethyl bromide, etc., since an alkyl halide can also be used as a reactant to introduce suitable alkyl groups into the cellulose ether. A particularly preferred embodiment of the method of preparing the cellulose ethers according to this invention comprises suspending the cellulose mercerized with alkali hydroxide in a reaction medium including at least one alkyl chloride having from two to four carbon atoms, alkoxylating it with ethylene oxide and propylene oxide and/or butylene oxide at a temperature within the range from about 50° to about 75°C, and alkylating it with an alkyl halide such as a chloride or bromide having from two to four carbon atoms, at a temperature from about 70° to about 120°C, suitably from 90° to 115°C, and preferably from 100° to 110°C, the reaction medium, which also serves as an alkylating agent, being present in an amount from about 0.2 to about 5 parts, preferably from 0.4 to 3 parts per part cellulose.

The cellulose to be mercerized with alkali hydroxide is preferably a dissolving-type wood cellulose or cotton linters and may be provided in sheet, flake or powder form. The mercerizing step is usually carried out with aqueous sodium hydroxide of from about 10 to about 50%, in particular 15 to 30%, and preferably from 18 to 24% NaOH by weight, at a temperature from about 10° to about 30°C, for a time from about one-quarter to about three hours. The mercerized cellulose is then squeezed to a press factor from about 2 to about 3.5, preferably from 2.2 to 3. The "press factor" refers to the ratio between the weight of pulp and aqueous alkali after squeezing and the weight of the air-dry starting pulp before mercerization. According to the invention, it is sufficient that in the etherification steps there is present 1.2 mol of alkali per mol of anhydroglucose unit, which previously, however, has been considered a too small proportion, when the purpose is to prepare conventional alkyl hydroxyalkyl cellulose ethers of high quality.

The mercerized and squeezed cellulose pulp is shredded or disintegrated, whereupon it is introduced into an autoclave, wherein known measures can be taken to retain or reduce the degree of polymerization (DP) of the cellulose. Preferably, a major part of the addition of the alkylene oxides is carried out at from 50° to 75°C, while the alkyl halide is reacted at a temperature from about 70° to about 120°C, suitably 90° to 115°C, and preferably 100° to 110°C. The alkylene oxides can be introduced in one or more portions, the ethylene oxide being preferably introduced at the start of the process. The reason, as previously mentioned, is that the ethylene oxide is more reactive than other alkylene oxides and forms primary hydroxyl groups, which react more readily with propylene oxide and/or butylene oxide than secondary hydroxyl groups. The ethylene oxide, propylene oxide and/or butylene oxide are suitably charged in a quantity which is about twice the stoichiometrically required amount.

In the preparation of cellulose ethers, certain additives, e.g. low-molecular-weight alcohols or ethers, are often included in the reaction medium because they improve the product properties when conventional alkyl hydroxyalkyl cellulose ethers are prepared. Furthermore, the addition of ethylene oxide to the cellulose is promoted by the additives while the alkylation is inhibited, and analyzable amounts of e.g. ethyl groups are introduced only at about 80°C. If a substantially pure alkyl halide having from 2 to 4 carbon atoms is utilized as the reaction medium, it is found that the cellulose ethers containing hydroxyethyl and higher hydroxyalkyl groups can be alkylated at a surprisingly low temperature. This is probably due to the fact that none of the components referred to, which inhibit alkylation but promote hydroxyalkylation, is present. Therefore, it is possible according to this invention to introduce alkyl groups at temperatures as low as 70°C, even if higher alkylating temperatures are generally preferred.

From a technological and economic viewpoint, it is desirable to use as small an amount of organic reaction medium as possible. From consideration of reaction kinetics, it has also been found to be suitable to use as the reaction medium an alkyl halide in a quantity that is so small that the mercerized cellulose is mainly suspended in a gas phase of alkyl halide. To that end, the quantity of reaction medium is usually within the range from about 0.2 to about 5 parts, preferably from 0.4 to 3 parts per part of cellulose. Under these conditions, a slight but appreciable alkylation takes place at a temperature of 70°C, the rate of reaction increasing rapidly as the temperature increases, preferably from 100° to 100°C, where the reaction time need not exceed two hours.

The specific hydrophilic properties of the products of this invention mean that products of moderate flocculating temperatures under some conditions tend to form gels, which subsequently cannot be worked up in a simple manner to form powders. On the other hand, the water-retaining effect of the products of this invention is an essential property for many applications. According to the invention, however, it has been found possible to avoid the gel stage, and to produce a granular or pulverulent composition by rapidly drying the water-wet washed and neutralized cellulose ether in two or more steps, the solids content being raised in the first step to above about 60% by weight. To avoid cooling of the product, the continued drying should be carried out immediately after the first step, the drying being carried to a solids content of about 90%.

The cellulose ethers of this invention have a broad use. For example, the cellulose ethers may be admixed to acrylate-based paints to give latex films having high transmission. Specially adapted for such use are cellulose ethers having a molecular substitution such that they have a flocculating temperature of about 60° to about 70°C. A relatively high flocculating temperature is desirable in this case, since it should be above the temperatures to which the latex is subjected in manufacture and storage. Other uses of the cellulose ethers are as thickening agents, inter alia in foods, as adhesives in adhesive compositions, and as consistency-improving and stabilizing agents. Furthermore, the cellulose ethers can be used in finishing compositions for the textile industry and in coating compositions for paper and paper products. When the molecular substitution with hydroxypropyl and hydroxybutyl is high, the cellulose ethers have excellent thermoplastic properties. By controlling the amount of ethylene oxide added to the cellulose, the solubility of the ether in water may be varied from insolubility to high solubility without loss of the thermoplastic properties. Also, cellulose ethers of varying solubility and flocculating temperature are obtainable by introducing both propylene oxide and butylene oxide into the cellulose and by varying their mutual ratio. The thermoplastic cellulose ethers can be used alone or in combination with other plastics for making plastic sheets, e.g. for use in the packaging or textile industry, or as bonding agents in lacquers and other paints.

The following Examples in the opinion of the inventors, represent preferred embodiments of the invention.

EXAMPLE 1

Sheet cellulose pulp of a type suitable for the preparation of cellulose acetate, in an amount of 1 part by weight was mercerized with a 20% aqueous sodium hydroxide solution for 30 minutes at room temperature. After mercerization was complete, the cellulose was squeezed to a press factor of 2.5. The resulting 2.5 parts alkali cellulose was then shredded and then transferred to an autoclave. Air was withdrawn from the autoclave, and a reaction mixture consisting of 1.5 parts ethyl chloride, 1.4 parts propylene oxide, and 0.3 part ethylene oxide were charged into the autoclave. After charging was complete, the temperature was raised to 70°C in 30 minutes and maintained at 70°C for 3 hours. Thereupon, the reaction was stopped and the remaining ethyl chloride was vented. The reaction product was slurried in hot water at a temperature of about 95°C, the remaining alkali being neutralized with acetic acid. After dewatering, drying and grinding, the product was analyzed, and a portion thereof was dissolved for determination of clarity, viscosity, fiber content, and flocculating temperature. Clarity was measured in a conventional manner as light transmission at 550 nm, and viscosity was determined with a Brookfield Viscosimeter LVT at 20°C. Fiber content and flocculating temperature were determined by the methods disclosed in "The Modocoll E Manual," published by Mo och Domsjö AB, Ornskoldsvik, Sweden, Sept. 1960, pages 40 and 41. The analyses showed that the product was a cellulose ether having $MS_{hydroxyethyl} = 0.7$, $MS_{hydroxypropyl} = 2.0$, and $DS_{ethyl} = 0.25$. Other characteristics were: viscosity 3,560 cp, clarity 96.9%, fiber content 0%, flocculating temperature 63.5°C. The cellulose ether exhibited very good properties throughout and was of a very high quality. Furthermore, it had a surprisingly high molecular substitution of hydroxyalkyl considering the amounts of alkylene oxides charged.

EXAMPLES 2 to 5

The cellulose ethers in these Examples were prepared according to a method similar to that of Example 1, except that the cellulose pulp was of a lower degree of polymerization, and the amount of propylene oxide was varied from 0.7 to 1.4 parts per part of dry pulp. The cellulose ethers obtained in this way had the following properties:

TABLE IV

| Example No. | (Examples 2 to 5) | | | |
|---|---|---|---|---|
| | 2 | 3 | 4 | 5 |
| Propylene oxide Parts per part dry cellulose pulp | 0.7 | 0.9 | 1.2 | 1.4 |
| Substitution | | | | |
| $MS_{hydroxyethyl}$ | 0.7 | 0.7 | 0.7 | 0.7 |
| $MS_{hydroxypropyl}$ | 1.0 | 1.3 | 1.6 | 2.0 |
| $DS_{ethyl}$ | 0.15 | 0.20 | 0.25 | 0.25 |
| Viscosity, cp (Brookfield Viscosimeter) | 4600 | 5700 | 2400 | 2450 |
| Clarity, % transmission | 89.8 | 92.5 | 92.7 | 95.8 |
| Fiber content, % | 1.4 | 1.0 | 0.5 | 0 |
| Flocculating temperature, °C | 85 | 77 | 69 | 64 |

It may be seen from the above data that an increased addition of propylene oxide results in products of higher clarity and lower flocculating temperature. The addition of 1.4 parts per part dry cellulose pulp, corresponding approximately to 4 molecules of propylene oxide per anhydroglucose unit, resulted in a cellulose ether of very high clarity and very low fiber content. Nevertheless, the cellulose ether had a viscosity as high as 2,450 cp, which implies that the cellulose ether of this Example was of very high quality.

EXAMPLES 6 to 15

These cellulose ethers were prepared in the same way as Example 1, except that the amount of ethyl chloride was varied, as shown in Table V below. The cellulose ethers had the following properties:

TABLE V

| Example No. | (Examples 6 to 15) | | | | | | | | | |
|---|---|---|---|---|---|---|---|---|---|---|
| | 6 | 7 | 8 | 9 | 10 | 11 | 12 | 13 | 14 | 15 |
| Ethyl chloride Parts per part dry cellulose pulp | 0 | 0.2 | 0.4 | 0.6 | 0.75 | 1.0 | 1.5 | 2.5 | 3.5 | 10.0 |
| Substitution | | | | | | | | | | |
| $MS_{hydroxyethyl}$ | 0.4 | 0.6 | 0.7 | 0.7 | 0.7 | 0.7 | 0.7 | 0.7 | 0.7 | 0.5 |
| $MS_{hydroxypropyl}$ | 0.4 | 1.8 | 1.8 | 1.9 | 2.0 | 2.0 | 2.0 | 2.0 | 1.9 | 1.3 |
| $DS_{ethyl}$ | — | 0.1 | 0.2 | 0.2 | 0.2 | 0.25 | 0.25 | 0.25 | 0.2 | 0.1 |
| Viscosity, cp (Brookfield Viscosimeter) | 640 | 1720 | 3370 | 4520 | 4370 | 4560 | 3560 | 3670 | 1600 | 980 |
| Clarity, % transmission | 95.7 | 97.1 | 96.7 | 96.0 | 95.4 | 97.3 | 96.9 | 97.1 | 95.0 | 87.6 |

TABLE V-continued

| Example No. | 6 | 7 | 8 | (Examples 6 to 15) 9 | 10 | 11 | 12 | 13 | 14 | 15 |
|---|---|---|---|---|---|---|---|---|---|---|
| Fiber content, % | 0.2 | 0.0 | 0.0 | 0.0 | 0.0 | 0.0 | 0.0 | 0.0 | 0.0 | 0.0 |
| Flocculating temperature, °C | 98.0 | 71.0 | 68.5 | 66.5 | 64.0 | 64.5 | 63.5 | 63.0 | 67.0 | 82.0 |

The above data show that the use of ethyl chloride in amounts from 0.4 to 2.5 parts per part dry cellulose pulp results in cellulose ethers which satisfy high requirements as regards important characteristics, such as viscosity, clarity and fiber content. The relatively low flocculating temperature exhibited by these cellulose ethers suggest a high conversion of ethylene oxide. Example 15 shows that when the amount of ethyl chloride was high and a major portion of the cellulose was slurried in the reaction, a final product was obtained which did not have quite as good properties as those obtained in the cases where the reaction medium comprised 0.4 to 2.5 parts ethyl chloride.

EXAMPLES 16 to 19

Viscose pulp was mercerized with a 20% aqueous sodium hydroxide solution for 30 minutes. Then a part of the sodium hydroxide solution was removed by squeezing to a press factor of 2.5. The mercerized cellulose was shredded and transferred to a reaction autoclave, which was also charged with 1.5 parts ethyl chloride and with ethylene oxide and butylene oxide in the amounts indicated in Table VI below. After heating from 30°C to 70°–75°C over 30 minutes, as indicated in the Table, the reaction mixture was held at 70°–75°C for 3 hours. The resulting reaction product was slurried in 95°C water and simultaneously neutralized with acetic acid. The product was dewatered, dried and ground, and was then dissolved in water to evaluate clarity, viscosity, fiber content, and flocculating temperature. The results are given in Table VI below.

TABLE VI

| Example No. | (Examples 16 to 19) 16 | 17 | 18 | 19 |
|---|---|---|---|---|
| Ethylene oxide Parts per part dry cellulose pulp | 0.55 | 0.82 | 0.55 | 0.82 |
| Butylene oxide Parts per part dry cellulose pulp | 0.68 | 0.90 | 0.68 | 0.90 |
| Reaction temperature, °C | 70 | 70 | 75 | 75 |
| Substitution | | | | |
| $MS_{hydroxyethyl}$ | 1.0 | 1.5 | 1.0 | 1.5 |
| $MS_{hydroxybutyl}$ | 0.7 | 1.0 | 0.8 | 1.0 |
| $DS_{ethyl}$ | 0.2 | 0.2 | 0.3 | 0.3 |
| Viscosity, cp (Brookfield Viscosimeter) | 2240 | 1690 | 1640 | 1600 |
| Clarity, % transmission | 96.8 | 98.6 | 93.7 | 98.3 |
| Fiber content, % | 0.0 | 0.0 | 0.6 | 0.0 |
| Flocculating temperature, °C | 61.5 | 53.5 | 53.5 | 48.5 |

The cellulose ethers produced were of high quality and formed solutions of high clarity and low fiber content. It may be seen from these Examples that the flocculating temperature can be controlled simply by adapting the reaction temperature and the amounts of ethylene oxide and butylene oxide in a suitable manner.

EXAMPLES 20 to 23

Mercerized, highly refined, cellulose paper pulp was alkoxylated with ethylene oxide, propylene oxide and butylene oxide, the amounts of the alkylene oxides being respectively 1.0, 2.0 and from 0.0 to 0.6 mol per mol of anhydroglucose unit. The reaction was carried out in the presence of 1.5 parts of ethyl chloride per part of dry cellulose pulp for 150 minutes at 75°C. The cellulose ethers produced had the following characteristics:

TABLE VII

| Example No. | (Examples 20 to 23) 20 | 21 | 22 | 23 |
|---|---|---|---|---|
| Butylene oxide mol per anhydroglucose unit | — | 0.2 | 0.4 | 0.6 |
| Substitution | | | | |
| $MS_{hydroxyethyl}$ | 0.7 | 0.7 | 0.7 | 0.7 |
| $MS_{hydroxypropyl}$ | 1.0 | 1.0 | 1.0 | 1.0 |
| $MS_{hydroxybutyl}$ | — | 0.1 | 0.2 | 0.3 |
| $DS_{ethyl}$ | 0.3 | 0.3 | 0.3 | 0.3 |
| Viscosity, cp (Brookfield Viscosimeter) | 21000 | 22500 | 24500 | 33000 |
| Clarity, % transmission | 24.8 | 31.3 | 37.4 | 38.3 |
| Fiber content, % | 25.1 | 19.8 | 13.5 | 8.1 |
| Flocculating temperature, °C | 78 | 70 | 65 | 61 |

The results show that the viscosity increases rapidly with increasing molecular hydroxybutyl substitution. The results also show that an appreciable improvement in clarity and fiber content is obtained with increasing hydroxybutyl substitution. The high viscosity level and the relatively low clarity and high fiber content are explained by the fact that a paper pulp of low reactivity was used as the starting material.

EXAMPLES 24 and 25

Sheet cellulose pulp suitable for making cellulose acetate was mercerized for 30 minutes at room temperature in a 20% aqueous sodium hydroxide solution. Then the mercerized cellulose was squeezed to a press factor of 2.5 and disintegrated by shredding. The shredded alkali cellulose was charged in an amount of 2.5 parts together with 1.5 parts ethyl chloride, 0.25 part ethylene oxide, and 1.1 parts propylene oxide, and then the temperature was gradually raised to 70°C over 30 minutes and held there for 3 hours. The reaction was stopped and the remaining ethyl chloride vented. Then the cellulose ether product was worked up by washing, neutralization, dewatering, drying and grinding.

Another cellulose ether was produced in the same manner as above, except that after reaction at 70°C the temperature was raised to 105°C over 25 minutes and maintained at this level for 75 minutes. The reaction was then stopped, and the ethyl chloride present was vented. Subsequently, the cellulose ether product was worked up as before. The cellulose ethers had the following characteristics:

TABLE VIII

| | (Examples 24 and 25) | |
|---|---|---|
| Example No. | 24 | 25 |
| Substitution | | |
| $MS_{hydroxyethyl}$ | 0.5 | 0.5 |
| $MS_{hydroxypropyl}$ | 1.5 | 1.5 |
| $DS_{ethyl}$ | 0.25 | 0.40 |
| Viscosity, cp (Brookfield Viscosimeter) | 1170 | 1540 |
| Clarity, % transmission | 99.7 | 96.0 |
| Fiber content, % | 0 | 0 |
| Flocculating temperature, °C | 69 | 52 |

The cellulose ether of $DS_{ethyl} = 0.4$ surprisingly exhibited a higher viscosity than the cellulose ether of $DS_{ethyl} = 0.25$, although it had more hydrophobic groups than the comparative product and although it had been treated at 105°C for 75 minutes, which per se promotes degradation of the cellulose ether and thereby reduction of its viscosity.

EXAMPLES 26 and 27

In the same way as in Examples 24 and 25, two different cellulose ethers were prepared by treating one cellulose ether at a higher temperature, except that ethylene oxide and propylene oxide were charged in amounts of 0.6 and 0.4 part, respectively, per part dry cellulose pulp. The cellulose ethers had the following properties:

TABLE IX

| | (Examples 26 and 27) | |
|---|---|---|
| Example No. | 26 | 27 |
| Substitution | | |
| $MS_{hydroxyethyl}$ | 1.3 | 1.3 |
| $MS_{hydroxypropyl}$ | 0.5 | 0.5 |
| $DS_{ethyl}$ | 0.25 | 0.80 |
| Viscosity, cp (Brookfield Viscosimeter) | 640 | 2750 |
| Clarity, % transmission | 98.2 | 99.7 |
| Fiber content, % | 0 | 0 |
| Flocculating temperature, °C | 95 | 62 |

In this case, too, the cellulose ether of the higher ethyl substitution exhibited considerably higher viscosity than the comparative product.

EXAMPLES 28 to 30

One part acetate cellulose pulp was mercerized for 30 minutes with 20% aqueous sodium hydroxide solution at room temperature, squeezed to a press factor of 2.5, and shredded. The shredded alkali cellulose was then charged together with 1.5 parts ethyl chloride or n-propyl chloride or n-butyl chloride, as indicated in Table X below, together with 0.3 part ethylene oxide and 1.4 parts propylene oxide. The amount of ethyl chloride, n-propyl chloride or n-butyl chloride varied in the three Examples. After 3 hours of reaction of 70°C, the temperature was raised to 105°C over 25 minutes and was held there for 75 minutes. The residual alkyl choride as vented and the resulting cellulose ether worked up. The cellulose ethers had the following properties:

TABLE X

| | (Examples 28 to 30) | | |
|---|---|---|---|
| Example No. | 28 | 29 | 30 |
| Reaction medium | ethyl chloride | n-propyl chloride | n-butyl chloride |
| Substitution | | | |
| $MS_{hydroxyethyl}$ | 0.7 | 0.6 | 0.5 |
| $MS_{hydroxypropyl}$ | 2.0 | 1.9 | 1.7 |
| $DS_{alkyl}$ | 0.6 | ~0.6 | ~0.6 |
| Viscosity, cp (Brookfield Viscosimeter) | 1280 | 1460 | 1260 |
| Clarity, % transmission | 98.7 | 98.6 | 97.9 |
| Fiber content, % | 0.1 | 0.0 | 0.0 |
| Flocculating temperature, °C | 50.0 | 43.5 | 38.5 |

These cellulose ethers had excellent viscosity, clarity and fiber content. The flocculating temperature drops considerably as the length of the alkyl chain increases.

In the specification and claims, all parts and percentages are by weight unless otherwise indicated.

Having regard to the foregoing disclosure, the following is claimed as the inventive and patentable embodiments thereof:

1. Nonionic cellulose ethers having attached to the cellulose molecule hydroxyethyl groups in a molecular substitution within the range from about 0.1 to about 2.5, hydroxyalkyl groups selected from the group consisting of hydroxypropyl and hydroxybutyl in a molecular substitution within the range from about 0.1 to about 4, and alkyl groups having from 2 to 4 carbon atoms in a degree of substitution within the range from about 0.05 to about 1.5.

2. Nonionic cellulose ethers according to claim 1, in which the molecular substitution of the hydroxyethyl groups is within the range from about 0.2 to about 1, the molecular substitution of the hydroxyalkyl groups is within the range from about 0.5 to about 2.5, and the degree of substitution of the alkyl groups is within the range from about 0.1 to about 1.

3. Nonionic cellulose ethers according to claim 1, in which the molecular and degree of substitution of the ether substituents are taken within the stated ranges so as to render the cellulose ether water-soluble.

4. Nonionic cellulose ethers according to claim 1, in which the molecular and degree of substitution of the ether substituents are taken within the stated ranges so as to render the cellulose ether organic solvent-soluble.

5. Nonionic cellulose ethers according to claim 1, having hydroxyethyl, hydroxypropyl, and ethyl substitutents.

6. Nonionic cellulose ethers according to claim 1, having hydroxyethyl, hydroxybutyl, and ethyl substitutents.

7. Nonionic cellulose ethers according to claim 1, having hydroxyethyl, hydroxypropyl, hydroxybutyl and ethyl substituents.

8. A process for preparing nonionic cellulose ethers having as ether substituents hydroxyethyl groups, hydroxyalkyl groups selected from the group consisting of hydroxypropyl and hydroxybutyl groups, and alkyl groups having from two to four carbon atoms, which comprises reacting alkali cellulose mercerized with aqueous alkali hydroxide solution with ethylene oxide, an alkylene oxide selected from the group consisting of propylene oxide and butylene oxide, and an alkyl halide having from two to four carbon atoms, in an organic reaction medium and recovering the resulting cellulose ether from the reaction medium.

9. A process according to claim 8, which includes washing the resulting cellulose ether, neutralizing remaining alkali hydroxide, and drying the cellulose ether to a solids content of above 90%.

10. A process according to claim 8, in which the organic reaction medium comprises an alkyl halide having from two to four carbon atoms.

11. A process according to claim 8, in which the alkoxylation is carried out at a temperature within the range from about 50° to about 75°C.

12. A process according to claim 8, in which the alkylation is carried out with alkyl halide serving also as reaction medium in an amount within the range from about 0.2 to about 5 parts per part of cellulose at a temperature within the range from about 70° to about 120°C.

13. A process according to claim 8, in which the alkoxylation is carried out in two steps, ethylene oxide being charged in the first step and propylene oxide and/or butylene oxide being charged together with any additional ethylene oxide in the steps which follow.

14. A process according to claim 8, in which the cellulose ether reaction product is neutralized and then washed in at least two washing steps, the cellulose ether being brought to a solids content of at least 60% in the first washing step and to at least 90% in the later washing step.

* * * * *